No. 775,154. PATENTED NOV. 15, 1904.
A. J. STICKLER.
SELF OILING LOOSE PULLEY.
APPLICATION FILED MAY 10, 1904.
NO MODEL.

Witnesses
Milton Lenoir
Watts T. Estabrook

Inventor
Andrew J. Stickler
by Theo. G. DuBois & Co.
his Attorneys

No. 775,154. Patented November 15, 1904.

UNITED STATES PATENT OFFICE.

ANDREW J. STICKLER, OF WINFIELD, IOWA.

SELF-OILING LOOSE PULLEY.

SPECIFICATION forming part of Letters Patent No. 775,154, dated November 15, 1904.

Application filed May 10, 1904. Serial No. 207,331. (No model.)

*To all whom it may concern:*

Be it known that I, ANDREW J. STICKLER, a citizen of the United States, and a resident of Winfield, in the county of Henry and State of Iowa, have invented a new and useful Improvement in Self-Oiling Loose Pulleys, of which the following is a specification.

My invention relates to an improvement in self-oiling loose pulleys, the object being to provide a self-oiling bearing which will run for almost an indefinite period without the necessity of reoiling; and the invention consists in a pulley made in two parts secured together and inclosing an oil-chamber adapted to be filled with lubricant and conducted to the bearing, where it is distributed at each end of the pulley, and means for agitating and insuring a continuous feed of the lubricant to the bearing.

My invention further consists in certain novel features of construction and combinations of parts, which will be hereinafter described, and pointed out in the claims.

Figure 1:
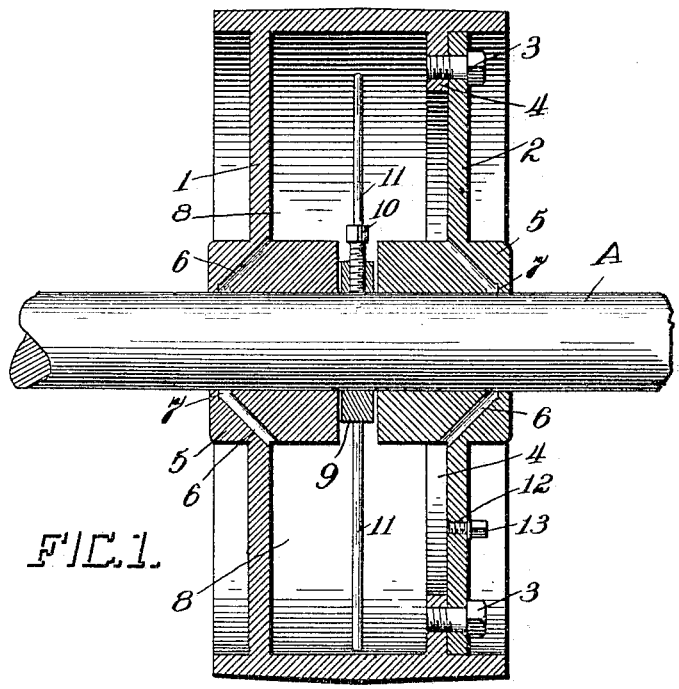
Figure 2:
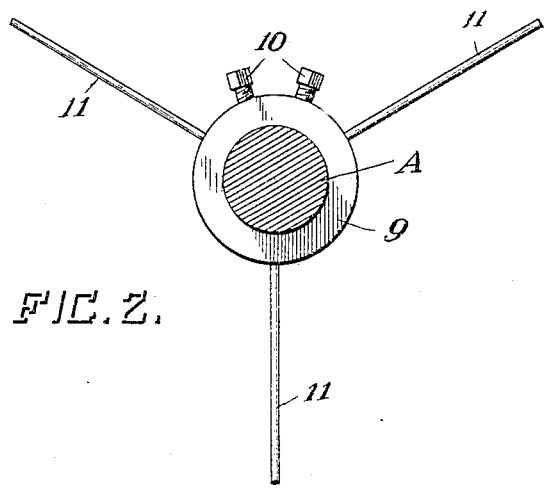

In the accompanying drawings, Figure 1 is a sectional view, and Fig. 2 is a detail.

A represents the shaft, and 1 and 2 are sections of the pulley, they being secured together by bolts 3 3, extending through the section 2 into the flange 4. The hubs 5 5 of the sections 1 and 2 are fitted to the shaft and provided with oil-ducts 6 6, which lead to the annular grooves 7 7 for conveying the oil from the inclosed chamber 8 to the shaft or axle.

A collar 9 is secured to the shaft or bearing at a point between the hubs 5 5 by means of one or more set-screws 10. Three arms 11 11, preferably of wire, extend radially from this collar to a point in close proximity to the inner wall of the pulley. As the lubricant contained in the chamber of the pulley is thrown outward by centrifugal force, due to the rapid revolution of the pulley, and one, at least, of the three wires is always above the center, the lubricant in this way is fed downward toward the center into the bearing, thus keeping the journal continuously lubricated. The oil thus fed to the collar works its way outward through the hubs until it strikes the grooves at the outer ends thereof, and from here the oil returns to the chamber through the ports, thus making a complete circuit, which continues as long as the pulley rotates.

The pulley is provided with an inlet-hole 12, through which it is supplied from time to time with the lubricant, the pulley being turned downward and filled until the oil reaches the level of the hole. A plug 13 is then screwed or otherwise fastened in the hole to retain the oil therein. When the pulley is started, the oil is forced to the rim, as explained, and finds its way back and forth in continuous circuits, as hitherto explained. In this way I provide a simple pulley which is self-lubricating for a long period.

It is evident that slight changes might be resorted to in the form and arrangement of the several parts described without departing from the spirit and scope of my invention, and hence I do not wish to limit myself to the exact construction herein set forth; but, Having fully described my invention, what I claim as new, and desire to secure by Letters Patent, is—

1. A self-oiling loose pulley comprising two hubs, a disk integral with each hub and one disk having a flanged rim, said flange being secured to the other disk whereby a chamber is inclosed, each hub provided with an annular groove in its interior and ducts leading from the grooves to the interior chamber of the pulley and radial arms located between the hubs.

2. The combination with a shaft, a collar secured thereto, radial arms extending from the collar, of a pulley comprising two hubs, disks and rim connected together, the hubs located on each side of the collar, and sufficiently separated to allow space between them and the side of the collar whereby to permit lubricant to enter between them, and the hubs provided with ducts which lead from their bores to the chamber inclosed in the hub.

In testimony whereof I have signed this specification in the presence of two subscribing witnesses.

ANDREW J. STICKLER.

Witnesses:
 DANIEL WILDE,
 A. S. FOLGER.